United States Patent [19]
Pescatore et al.

[11] Patent Number: 4,574,182
[45] Date of Patent: Mar. 4, 1986

[54] CONTINUOUS FURNACE FOR SOLDERING ELECTRONIC COMPONENTS

[75] Inventors: Richard Pescatore, Antibes; Jean-Jack Boumendil, Villeneuve-Loubet, both of France

[73] Assignee: Piezo-Ceram Electronique, Antibes, France

[21] Appl. No.: 552,975

[22] Filed: Nov. 17, 1983

[30] Foreign Application Priority Data

Nov. 17, 1982 [FR] France ............... 82 19220

[51] Int. Cl.⁴ .............................................. F27B 9/06
[52] U.S. Cl. ................... 219/388; 219/390; 165/65; 228/232
[58] Field of Search .......... 165/65; 432/144, 152, 432/171, 64, 226; 219/388, 390; 228/227, 232

[56] References Cited

U.S. PATENT DOCUMENTS

| | | | |
|---|---|---|---|
| 2,215,729 | 9/1940 | Rüttimann | 165/65 |
| 2,253,897 | 8/1941 | Doderer | 432/64 |
| 3,122,117 | 2/1964 | Marzullo | 228/232 |
| 3,389,535 | 6/1968 | Armetti | 219/388 |
| 3,415,503 | 12/1968 | Beck | 432/152 |
| 3,608,187 | 9/1971 | Shutt | 228/227 |
| 3,705,253 | 12/1972 | Hicks | 219/390 |
| 3,756,489 | 9/1973 | Chartet | 219/388 |
| 3,809,859 | 5/1974 | Wells | 219/345 |
| 3,982,887 | 9/1976 | Kendziora | 432/152 |
| 4,366,177 | 12/1982 | Wells | 219/388 |
| 4,416,623 | 11/1983 | Takahashi | 219/390 |
| 4,446,358 | 5/1984 | Comerford | 219/388 |

FOREIGN PATENT DOCUMENTS

| | | | |
|---|---|---|---|
| 950450 | 10/1956 | Fed. Rep. of Germany | 219/388 |
| 1508533 | 3/1973 | Fed. Rep. of Germany | . |
| 2658489 | 6/1978 | Fed. Rep. of Germany | 432/144 |
| 2149260 | 3/1973 | France | . |
| 2295386 | 7/1976 | France | . |
| 2412802 | 7/1979 | France | . |
| 51-108612 | 9/1976 | Japan | 432/144 |
| 57-106469 | 7/1982 | Japan | 228/227 |

Primary Examiner—C. L. Albritton
Assistant Examiner—Teresa J. Walberg
Attorney, Agent, or Firm—Watson, Cole, Grindle & Watson

[57] ABSTRACT

A continuous soldering furnace for the assembly of electronic components on a support which is opaque to infrared rays by a soldering product, includes a metal muffle, an endless metal belt, one or more heaters extending over a part of the muffle, a forced cooler extending over another part of the muffle which is situated following the preceding part, parts for introducing one or more gases inside the muffle, closures provided at each end of the muffle. The heaters are both external to the muffle and inside the muffle. The furnace is adapted for use in the electronics industry.

2 Claims, 2 Drawing Figures

CONTINUOUS FURNACE FOR SOLDERING ELECTRONIC COMPONENTS

The invention relates to a continuous furnace for soldering electronic components.

The present continuous furnace makes it possible to carry out soldering cycles of electronic components in succession;

in a controlled atmosphere, with a control of homogeneity of heating above the eutectic of the solder employed, with a control of the slope of rise in temperature of the melting peak, with a control of the slope of cooling of the melting peak.

It makes it possible to control all the parameters which are involved in the process of forward transport of components on a substrate which is opaque to infrared and which are peculiar to the solders employed.

More particularly, the invention relates to a continuous soldering furnace for the assembly of electronic components on a support which is opaque to infrared rays by means of a soldering product, which furnace comprises a metal muffle, an endless metal belt entering the muffle at one end of the latter and leaving it at the other end, means for driving the said metal belt, means of heating extending over a part of the length of the muffle, means of thermal insulation provided around the heated part of the muffle, means of forced cooling extending over another part of the length of the muffle which is situated following the preceding part, means for introducing one or more gases inside the muffle, means of isolation provided at each end of the muffle to isolate the interior space of the latter with respect to the exterior, wherein the means of heating comprise means of heating which are external to the muffle and ensure the temperature rise of the assembly to be soldered up to a temperature plateau below the eutectic temperature of the soldering product, and means of heating inside the muffle heating the soldering product to a temperature above the said eutectic temperature.

Supports which are opaque to infrared rays are, for example, ceramic substrates, such as alumina substrates.

The following description, with reference to the attached non-limiting drawings given by way of example, will explain how the invention may be carried out, the details which become apparent, from both the drawings and the text, forming, of course, part of the said invention.

BRIEF DESCRIPTION OF THE DRAWINGS

FIG. 2 is a graph showing the temperature profile in a furnace according to the invention of the type of that illustrated in FIG. 1, for two different types of soldering alloys, as a function of the time of residence in the furnace of an article to be soldered which is placed on the conveyor belt.

DESCRIPTION OF THE PREFERRED EMBODIMENTS

Figure 1:
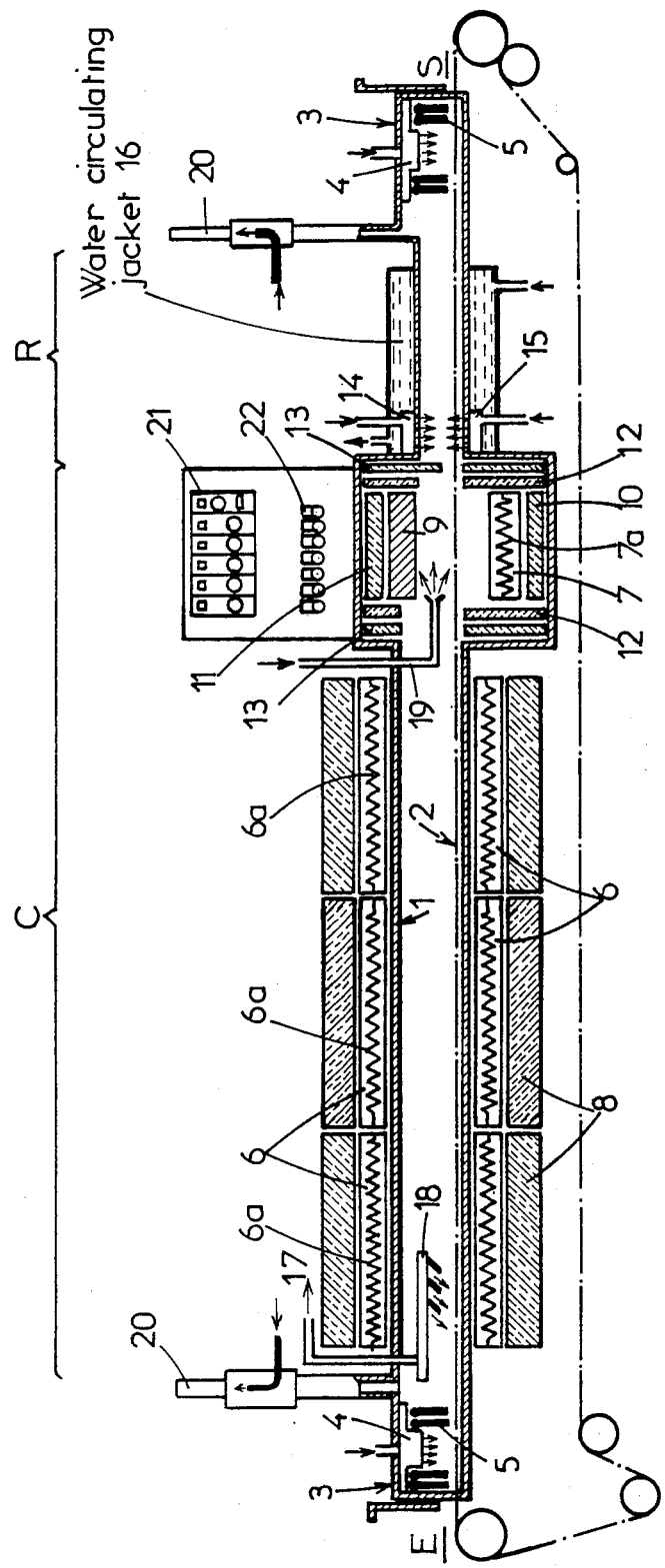
FIG. 1 is a diagrammatic view illustrating an embodiment of the furnace of the invention.

FIG. 1 shows a furnace according to the invention. This furnace comprises a metal muffle 1 of elongated shape (for example of a length of approximately 2 meters) having a rectangular transversal cross-section. This muffle is crossed from left to right by an endless metal conveyor belt 2 on which are placed, at the entry side E, the articles to be processed. The soldered articles are collected at the exit S of the furnace. The speed of travel of the belt 2 is, for example, approximately 50 cm/min. Gas barriers 3 which isolate the furnace from the exterior are provided at the entry E and the exit S of the muffle. Each of these barriers consists of a distributor 4 which sends a stream of inert gas, such as nitrogen, directed downwards. On both sides of the distributor there are provided articulated shutters 5 which channel the gas stream while allowing the passage of the articles when these are present on the conveyor belt.

The muffle comprises a heating part C and a cooling part R which follows the preceding one. The means for heating the part C comprise, from left to right, six external heating elements 6 which are provided above and below the muffle and are distributed in three successive groups, and an internal heating element 7. Efficient thermal insulation 8 is provided around the heating part C. The external elements 6 consist, in a conventional manner, of electric resistors 6a housed in sleeves of a ceramic material. Each of these elements can have, for example, a length of approximately 30 cm. The internal heating element 7 is housed in the muffle itself, which is oversized for this purpose. This element 7 comprises an electric resistor 7a, jacketed with ceramic, which is arranged in the lower part of the muffle, underneath the conveyor belt. A reflector 9 is provided in the upper part of the muffle, facing the metal belt. Thermal insulations 10, 11, 12 and 13 are provided between the element 7 and the muffle, on the one hand, and the reflector and the muffle, on the other hand.

The cooling part R follows immediately the heating part C. The part R comprises means of fast cooling with gas jets (for example $N_2$ or an $N_2/H_2$ mixture) aimed directly at the article, consisting of two gas distributors 14 and 15 placed, respectively, in the upper part and in the lower part of the muffle, and a device for cooling the assembly, consisting of a water circulating jacket 16.

The furnace comprises, moreover, a first supply line 17 for inert gas, such as nitrogen, supplying a distribution rack 18 which extends over an appreciable part of the length of the first external heating unit. By virtue of the length of the rack and by virtue of the fact that the gas discharge orifices are provided only at the end of the rack, the gas is preheated before being injected into the muffle.

Also provided is a second supply line 19 for a mixture of inert gas (such as $N_2$) and hydrogen containing, for example, 5% by volume of hydrogen, which discharges, in the muffle, in the region of the internal heating element 7. The furnace of the invention is also equipped with two venturi stacks 20 allowing the gases to be discharged from the muffle without unopportune disturbance.

Finally, a unit 21 for controlling the means of heating and a unit 22 for control of the fluids are provided, in a conventional manner.

The furnace of the invention makes it possible to ensure:

(a) a rapid rise in homogeneous temperature of the assembly of the components to be soldered and of their support. This is produced by the external means of heating 6 which heat the article to be processed from above and from below, the heat being transmitted to the article by conduction (from below) and by convection and radiation (from above). This temperature rise is produced in a protective inert atmosphere, for example by introducing nitrogen by means of the line 17. The temperature rise ends in a plateau, as shown in FIG. 2, situated slightly below the eutectic temperature of the soldering product employed. This plateau permits the removal of the solvents contained in the soldering product. For example, in the case of an Sn/Pb (60/40) alloy in the form of paste, the plateau may be situated close to 160° C. In the case of an Sn/Pb (95/5) alloy in the form of paste, the plateau would be higher, for example in the region of 210° C. The slope of the curve of temperature rise can be adjusted by acting on the heating power of each of the three groups of external heating elements 6, through the intermediacy of the regulator 21.

(b) a fast heating, in a reducing atmosphere ($N_2/H_2$) of the soldering product up to the "melting peak" (a temperature above the eutectic temperature of the soldering product) by the internal means of heating 7, with a possibility of controlling the duration of this peak by acting on the driving speed of the conveyor belt. This fast heating is ensured by the electric resistor 7a which heats, by direct infrared radiation, the underside of the infrared-opaque support of the article to be processed, which in its turn heats the soldering products applied to the said support. Of course, this requires that the articles to be processed have their support facing the conveyor belt. The reflector 9 also reflects a proportion of the radiation on the top of the article. The electronic components carried by the support are subjected to a lesser heating, being in the main exposed to reflected radiation, which reduces to a minimum the risk of damage through excessive heating.

(c) after the melting, a fast cooling by the gas jets which solidify the solder with a possibility of regulating the speed of cooling by acting on the gas flow rate.

(d) finally, the cooling of the assembly by the water circulating jacket 16.

FIG. 2 shows the typical temperature profiles as a function of time, in a furnace of the type of that of FIG. 1, in the case where pastes of an Sn/Pb alloy are employed as soldering products. The curve 1 corresponds to the Sn/Pb (60/40) alloy and the curve 2 corresponds to the Sn/Pb (95/5) alloy.

A typical duration for a soldering operation is approximately 4 minutes. The duration of each temperature plateau is 70 seconds (curve 1) and 60 seconds (curve 2). The duration of each melting peak is 18 seconds (curve 1) and 12 seconds (curve 2). Each peak corresponds to temperatures of 290°–325° C. (curve 2) and 180°–220° C. (curve 1).

The furnace of the invention can be employed to carry out the soldering of a wrap contact tails, tails of thermistors, connectors, casings for ultra-high frequency components, of connections on capacitor chips and any transfer of components on a substrate, and the like.

It is obvious that the embodiment described is only an example and that it would be possible to modify it, particularly by substitution of equivalent techniques, without departing thereby from the scope of the invention.

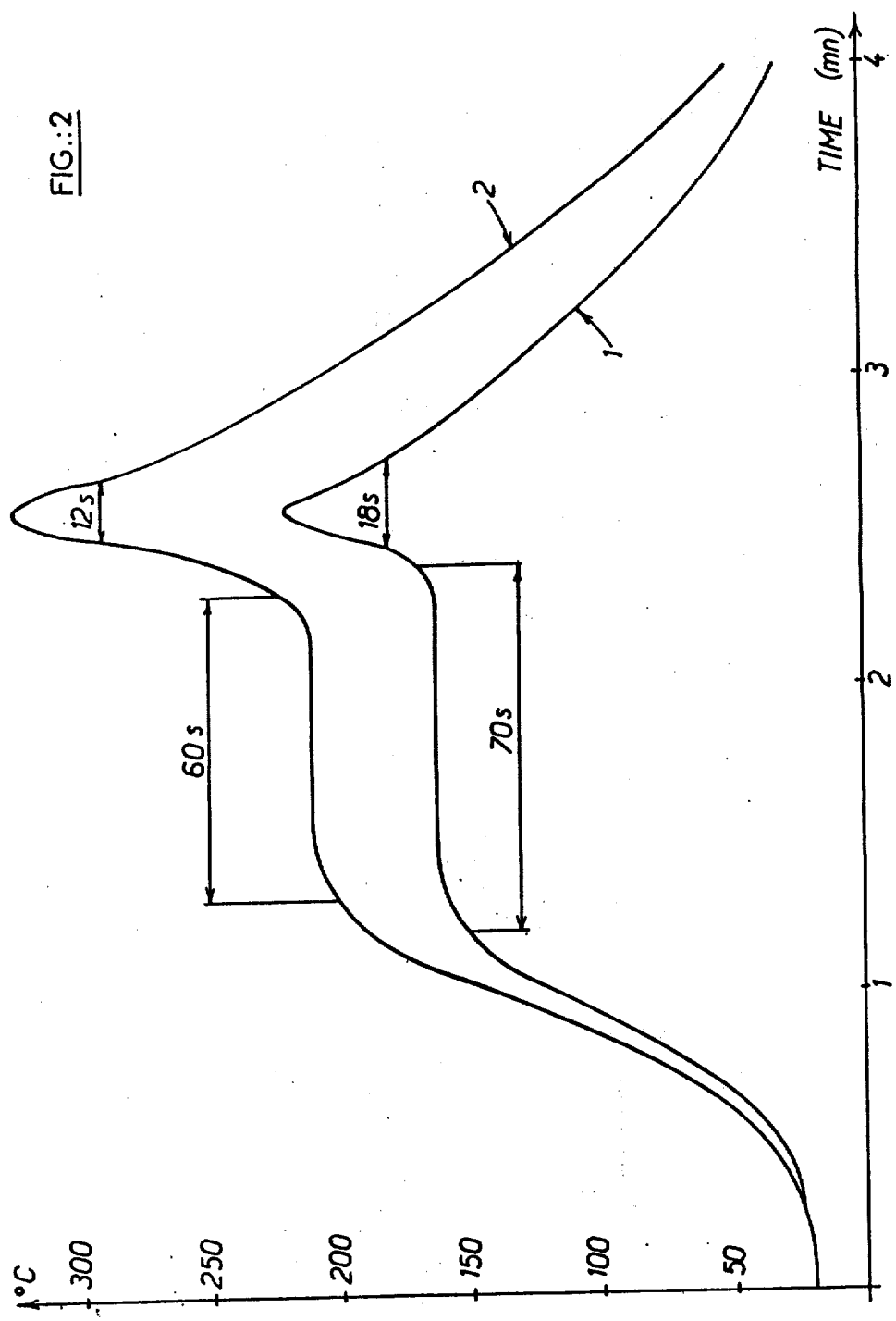

We claim:

1. A continuous furnace for soldering an assembly of electronic components mounted on a substrate which is opaque to infrared rays by means of a soldering product having an eutectic melting temperature, comprising in combination:

a metallic muffle defining a furnace chamber through which said assembly to be soldered is to travel, said muffle being adapted to contain said assembly in a controlled atmosphere and having an inlet and an outlet for entry and exit of said assembly, respectively, and said chamber comprising, in order, from the inlet to the outlet of said muffle, a first heating section, a second heating section and a cooling section;

conveying means for transporting said assembly, said means entering the chamber at the inlet of said muffle and leaving it at the outlet of said muffle;

means for driving said conveying means;

first heating means, external to said muffle, for heating said first heating section and ensuring a temperature rise of said assembly up to a temperature plateau below the eutectic melting temperature of the soldering product;

second heating means, internal to said muffle, for heating, in said second heating section, the soldering product to a temperature above said eutectic melting temperature while heating said electronic components to a lower temperature, said second heating means including infrared-ray-emitting heating means located beneath said conveying means and a reflector provided, in said second heating section, above and facing said conveying means;

means for thermally insulating said first and second heating sections;

forced cooling means for cooling said cooling section;

means for introducing at least one gas into said chamber; and isolation means provided at the inlet and outlet of said muffle for isolating the chamber.

2. A furnace as claimed in claim 1, wherein said infrared-ray-emitting heating means are ceramic-jacketed resistors.

* * * * *

UNITED STATES PATENT AND TRADEMARK OFFICE
CERTIFICATE OF CORRECTION

PATENT NO. : 4,574,182

DATED : March 4, 1986

INVENTOR(S) : Richard Pescatore et al.

It is certified that error appears in the above-identified patent and that said Letters Patent is hereby corrected as shown below:

Figure 2 should be added as per attached sheet.

Signed and Sealed this

Fourth Day of November, 1986

[SEAL]

Attest:

DONALD J. QUIGG

*Attesting Officer*  *Commissioner of Patents and Trademarks*